US008934158B2

(12) United States Patent
Takahashi

(10) Patent No.: US 8,934,158 B2
(45) Date of Patent: Jan. 13, 2015

(54) IMAGE READING APPARATUS, IMAGE FORMING APPARATUS, AND METHOD OF IMAGE READING USING WAVELENGTH DISTRIBUTION CONTROL UNIT TO PRODUCE PLURAL DURATIONS EACH HAVING DIFFERENT PEAK WAVELENGTH IN EACH MAIN SCANNING

(75) Inventor: Masayoshi Takahashi, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 725 days.

(21) Appl. No.: 13/241,402

(22) Filed: Sep. 23, 2011

(65) Prior Publication Data
US 2012/0075647 A1    Mar. 29, 2012

(30) Foreign Application Priority Data

Sep. 29, 2010  (JP) ................................. 2010-219210

(51) Int. Cl.
    *H04N 1/46*  (2006.01)
    *H04N 1/48*  (2006.01)
    *H04N 1/40*  (2006.01)

(52) U.S. Cl.
    CPC .............. *H04N 1/48* (2013.01); *H04N 1/40056* (2013.01)
    USPC .......... 358/530; 358/1.13; 358/509; 358/475; 372/9; 372/23; 372/29.014

(58) Field of Classification Search
    CPC .......... H04N 1/193; H04N 2201/0081; H04N 1/02865; H04N 1/401; H04N 2201/40056; H04N 2201/0458; H04N 9/315; H04N 9/3155
    USPC ................. 358/1.9, 1.13, 501, 505, 509, 475; 372/9, 23, 29.014
    See application file for complete search history.

(56) References Cited

U.S. PATENT DOCUMENTS

| 5,729,361 A * | 3/1998 | Suggs et al. ................... 358/505 |
| 2005/0200578 A1* | 9/2005 | Lee et al. ......................... 345/82 |
| 2010/0195171 A1* | 8/2010 | Ishido ............................ 358/509 |

FOREIGN PATENT DOCUMENTS

| JP | Hei 10-42100 | 2/1998 |
| JP | 2002-324685 | 11/2002 |

OTHER PUBLICATIONS

Chinese Office Action—Feb. 11, 2014.
Driving Current Dependence of Emission Spectra and Spectro-color Characteristics of InGaN Based LEDs—Liu Xingren, Guo Guanghua, Liu Xiuhua—Mar. 2004, vol. 15, No. 1.

* cited by examiner

*Primary Examiner* — Jamares Q Washington
(74) *Attorney, Agent, or Firm* — Gerald E. Hespos; Michael J. Porco; Matthew T. Hespos

(57) ABSTRACT

An image reading apparatus includes a light-emitting device having a peak wavelength that varies depending on a value of a drive current, and illuminates a document with illumination light from the light-emitting device. A light receiving unit receives a light reflected from the document when the illumination light is emitted from the light-emitting device, and converts the received reflected light into image data at a predetermined sensitivity depending on the wavelengths of the received light. A current drive circuit supplies the drive current to turn on the light-emitting device. A wavelength distribution control unit produces two or more durations each having a different value of the drive current by controlling the current drive circuit during each main scanning to the document to produce two or more durations each having a different peak wavelength in each main scanning.

19 Claims, 8 Drawing Sheets

IMAGE READING APPARATUS, IMAGE FORMING APPARATUS, AND METHOD OF IMAGE READING USING WAVELENGTH DISTRIBUTION CONTROL UNIT TO PRODUCE PLURAL DURATIONS EACH HAVING DIFFERENT PEAK WAVELENGTH IN EACH MAIN SCANNING

BACKGROUND OF THE INVENTION

1. Field of the Invention

The present invention relates to an image reading apparatus, an image forming apparatus, and a method of image reading, which use white light produced in use of light emitted from LEDs as white light to be irradiated to documents, for example.

2. Description of the Related Art

As a light source for scanning a document in an image reading apparatus, such as a scanner, provided in an image forming apparatus, a light source that uses a white LED is available, with such a white LED being constituted by a blue LED that emits blue light in response to a drive current and an yttrium-aluminum-garnet (YAG) phosphor that converts the blue light into yellow light, and white light is emitted by the phosphor emitting fluorescence with the blue light from the blue LED.

The emission wavelength for the white LED has a specific profile (spectral intensity profile) as shown by solid line Wn in FIG. 2 for example. More specifically, the characteristic curve of the profile indicates intensity peaks at the wavelengths at about 460 nm and about 580 nm, has a narrow wavelength distribution width in the blue wavelength range (400 nm to 500 nm) and a wide wavelength distribution width in the yellow wavelength range (550 nm to 600 nm).

When light is illuminated to an object, it is partly reflected and the remaining fraction is absorbed or transmitted. The color tones of the object are determined by the wavelengths of light that are partly reflected. For example, when an object reflects red wavelengths more than others, this object appears red. An object that reflects red wavelengths appears white when it also reflects other wavelengths as well.

Some images sensors such as CCDs are known to utilize this principle. When white light emitted from the white LEDs is illuminated to the document, some fraction is reflected therefrom as the reflected light. The image sensor receives the reflected light and photoelectrically converts it into image data indicating density values of each of RGB with predetermined RGB spectral sensitivity (spectral sensitivity characteristic) according to wavelength of the received light. The image sensor thus produces the image data corresponding to the scanned document.

As shown in FIG. 4 for example, the image sensor converts the spectrum of the received light having wavelengths in the region of about 400 nm to about 700 nm, into image data indicating density value of red (R) based on the sensitivity shown as dotted line in the figure. Likewise, the image sensor converts the spectrum of the received light having wavelengths in the region about 400 nm to about 700 nm, into image data indicating density value of green (G) based on the sensitivity shown as solid line in the figure. It also converts the spectrum of the received light having wavelengths in the region about 400 nm to about 580 nm, into image data indicating density value of blue (B) based on the sensitivity shown as dash-dotted line in the figure. The higher the sensitivity for each of RGB colors, the higher the density values of each of RGB when the light corresponding to the wavelengths in that region is received.

The image sensor does not always receive the light with the constant intensity for all the wavelengths. Instead, it may receive light with different intensities for different wavelength ranges, as shown in, for example, FIG. 2. In this case, the image sensor increases density values of each of RGB when received the light of the wavelength range, according to increase the intensity of light different from depending on the wavelength range of the received light.

However, following problems arise when the white light emitted from the white LED having the spectral intensity profile as shown in FIG. 2 is irradiated to a document having blue tone, and the reflected light reflected from the document is converted into image data using an image sensor having the spectral sensitivity characteristic as shown in FIG. 4. The reflected light reflected from the document has a range of blue wavelengths that is narrower than a range for the natural blue tone of the document because the white light to be irradiated to the document has a narrow range of blue wavelengths. This may result in an image data having a low density value of blue (B) when converted by an image sensor.

This problem does not occur when the white light emitted from the white LED having the spectral intensity profile as shown in FIG. 2 is irradiated to a document having yellow tone, and the reflected light reflected from the document is converted into image data using an image sensor having the spectral sensitivity characteristic as shown in FIG. 4. In this case, the white light to be irradiated to the document has a wider range of yellow wavelengths. The yellow wavelengths of the reflected light reflected from the document encompass all wavelengths for the natural yellow tone of the document. The image sensor converts the light into an image data having high density values of red (R) and green (G), that is to say, as a mixed color of red (R) and green (G) that appear yellow to our eyes.

As described above, there is a problem that some color tones cannot be precisely reproduced as image data due to wavelength distribution of the light irradiated from a light source to a document.

SUMMARY OF THE INVENTION

Accordingly, the present invention has been made with respect to the aforementioned problems, and an object thereof is to provide an image reading apparatus, an image forming apparatus, and a method of image reading with which reproductivity of color tones can be improved.

An image reading apparatus according to one aspect of the present invention that achieves the aforementioned object includes: a light source unit which includes a light-emitting device having a characteristic that peak wavelength varies depending on a value of a drive current, and illuminates a document with an illumination light using light from the light-emitting device; a light receiving unit for receiving a reflected light reflected from the document when the illumination light is emitted from the light source unit, and for converting the received reflected light into an image data at a predetermined sensitivity depending on the wavelengths of the received light; a current drive circuit for supplying the drive current to the light-emitting device to turn on the light-emitting device; and a wavelength distribution control unit for producing two or more durations each having a different value of the drive current by controlling the current drive circuit during the main scanning in each main scanning to the document to produce two or more durations each having a different peak wavelength in each main scanning.

An image forming apparatus according to another aspect of the present invention comprises the image reading apparatus, and an image forming unit that forms a color image represented by image data generated by the image reading apparatus and transfers the color image to a paper.

A method of image reading according to yet another aspect of the present invention includes: a first step of producing an illumination light by using light from a light-emitting device of which peak wavelength varies depending on a value of a drive current and irradiating the produced illumination light to a document; a second step of receiving a reflected light reflected from the document when the illumination light is emitted, and converting the received reflected light into an image data at a predetermined sensitivity depending on the wavelength of the received light; and a third step of producing two or more durations each having a different value of the drive current during the main scanning by controlling the drive current for turn-on a light-emitting device in each main scanning to the document to produce two or more durations each having a different peak wavelength in each main scanning.

DETAILED DESCRIPTION OF THE PREFERRED EMBODIMENTS

Now, an image reading apparatus and an image forming apparatus according to an embodiment of the present invention are described with reference to the drawings. In the following embodiment, description is made in conjunction with a case where the image reading apparatus and the image forming apparatus according to the present invention is integrated as a multifunction machine having color copying, scanning, faxing, and printing functions.

Figure 1:
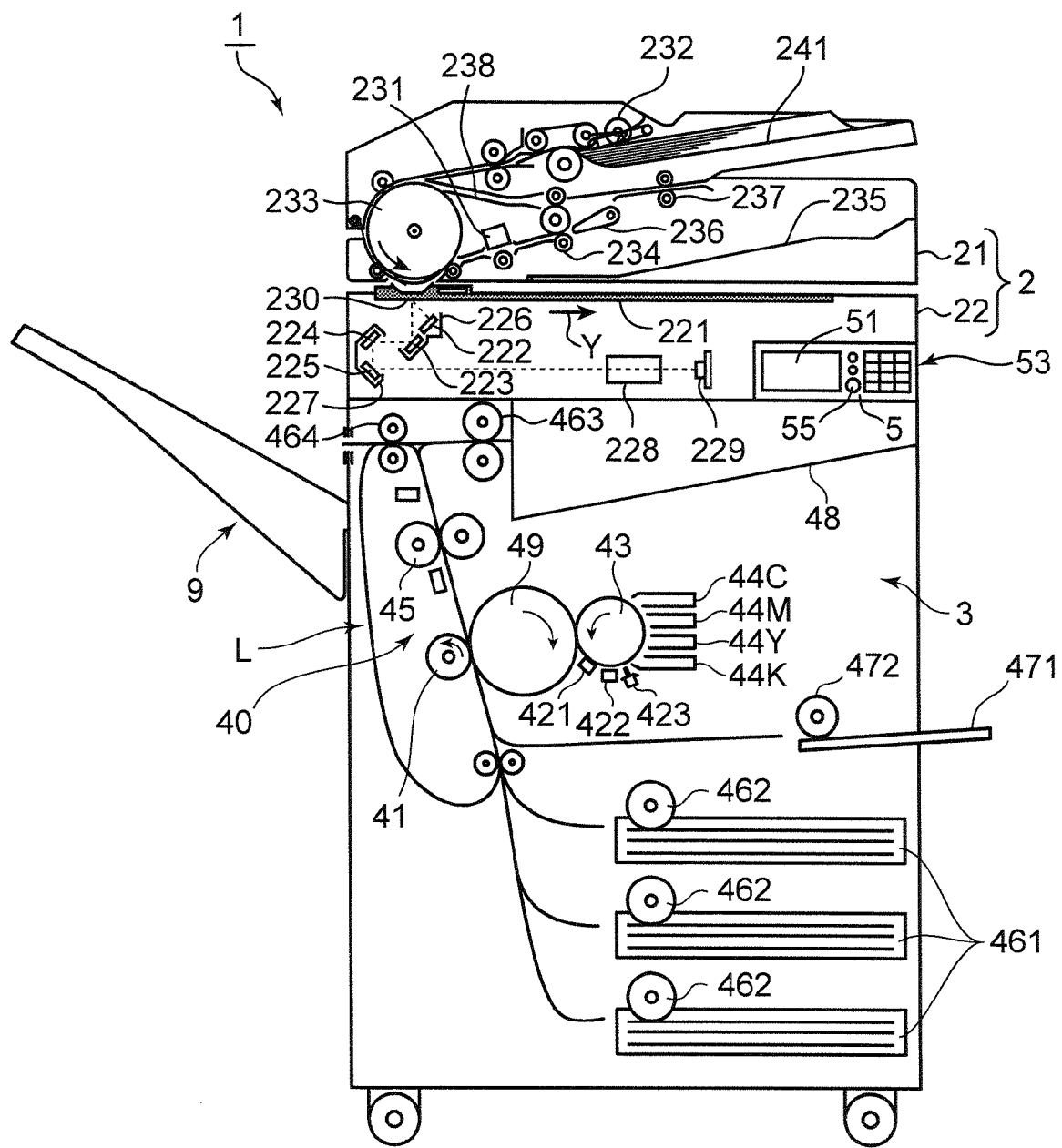
FIG. 1 is a cross-sectional view showing an example of an internal structure of a multifunction machine.

As shown in FIG. 1, a multifunction machine 1 is generally made up of an image reading apparatus 2 and a machine body 3 as an example of a movable unit according to the present invention. The image reading apparatus 2 comprises a document delivery unit 21 and a scanner unit 22. The document delivery unit 21 implements the ADF, and comprises a document feeder tray 241, a paper feed roller 232, a sheet delivery drum 233, a paper exit roller 234, and a paper exit tray 235. The document feeder tray 241 is a place into which documents are loaded. The documents loaded into the document feeder tray 241 are picked up one by one with the paper feed roller 232 and sent to the sheet delivery drum 233. The sheet passed over the sheet delivery drum 233 is ejected into the paper exit tray 235 with the paper exit roller 234.

The scanner unit 22 optically scans an image of the document to generate image data. The scanner unit 22 is provided in the machine body 3. The scanner unit 22 comprises a document glass 221, a light source 222, a first mirror 223, a second mirror 224, a third mirror 225, a first carriage 226, a second carriage 227, an imaging lens 228, a charge coupled device (CCD) 229 as light receiving unit according to the present invention.

In the scanner unit 22 has a white LED which is a light-emitting device according to the present invention used as the light source 222. The white light emitted from the light source 222 is reflected from the document as a reflected light. The aforementioned first mirror 223, the second mirror 224, the third mirror 225, the first carriage 226, the second carriage 227, and the imaging lens 228 direct the reflected light to a CCD 229. The CCD 229 is an example of a line sensor unit. A part of the white light illuminated to the document that is reflected therefrom is received to scan the document. The intensities of the red component, the green component, and the blue component of the received light are converted into and produced as their respective electrical signals.

The light source 222 is an example of a light source unit, and includes an LED having a characteristic in which the peak wavelength varies depending on a value of a drive current. The light from that LED is used to generate the white light. The generated white light is illuminated to the document. More specifically, the white LED used for the light source 222 has a combination of a blue LED that emits blue light, and a phosphor covering the blue LED. In this white LED, the phosphor converts some fraction of the blue light emitted from the blue LED to fluorescence. Other fraction of the blue light is transmitted through the phosphor. The combination of the fluorescence and the transmitted blue light results in white emission.

Figure 2:
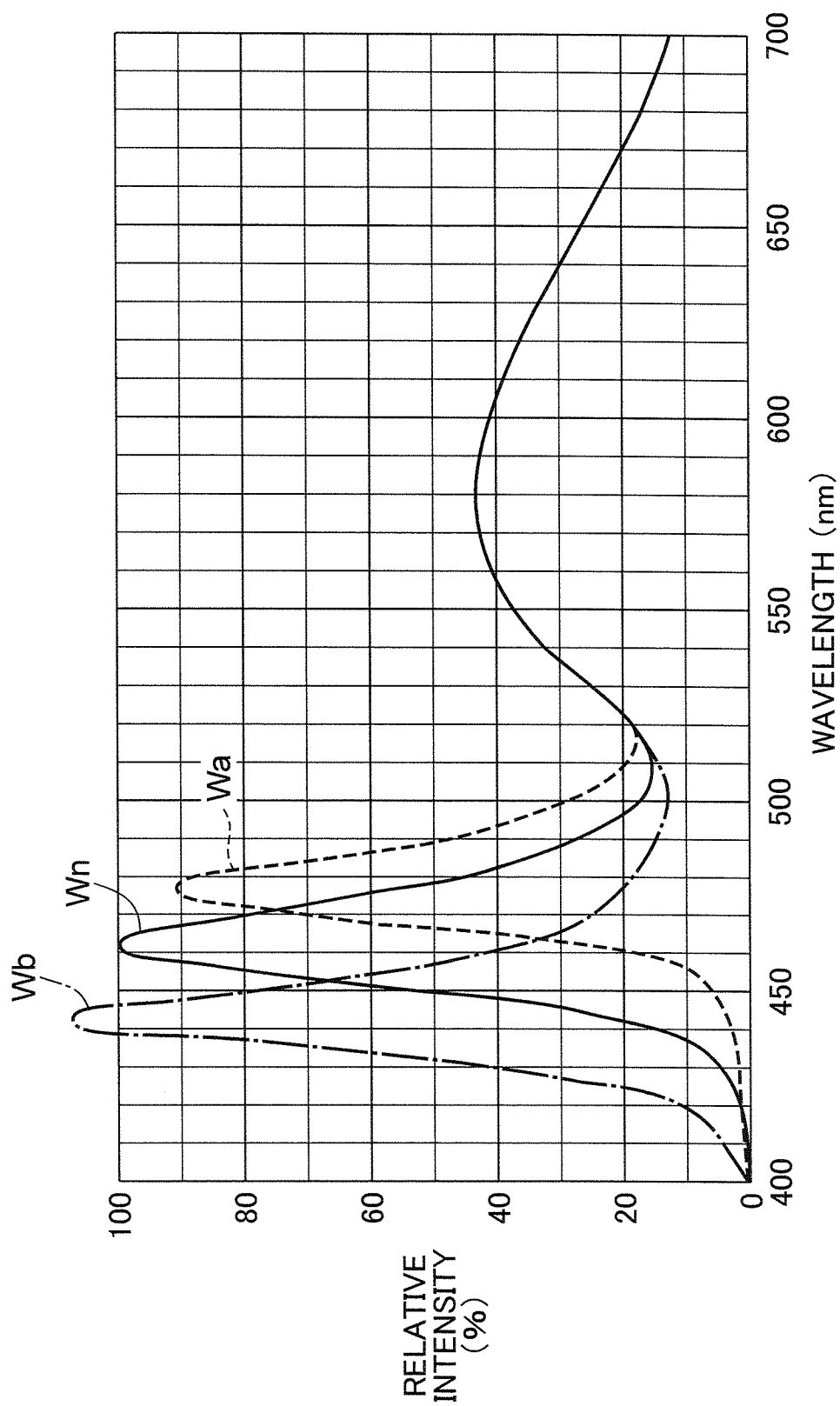
FIG. 2 is a view illustrating an example of a wavelength distribution of a white LED.

The emission wavelength for the white LED has a specific profile (spectral intensity profile) as shown by solid line Wn in FIG. 2 for example. More specifically, the characteristic curve of the profile indicates intensity peaks at the wavelengths at about 460 nm and about 580 nm, and has a narrow wavelength distribution width in the blue wavelength range (400 nm to 500 nm) and a wide wavelength distribution width in the yellow wavelength range (550 nm to 600 nm).

Figure 3:
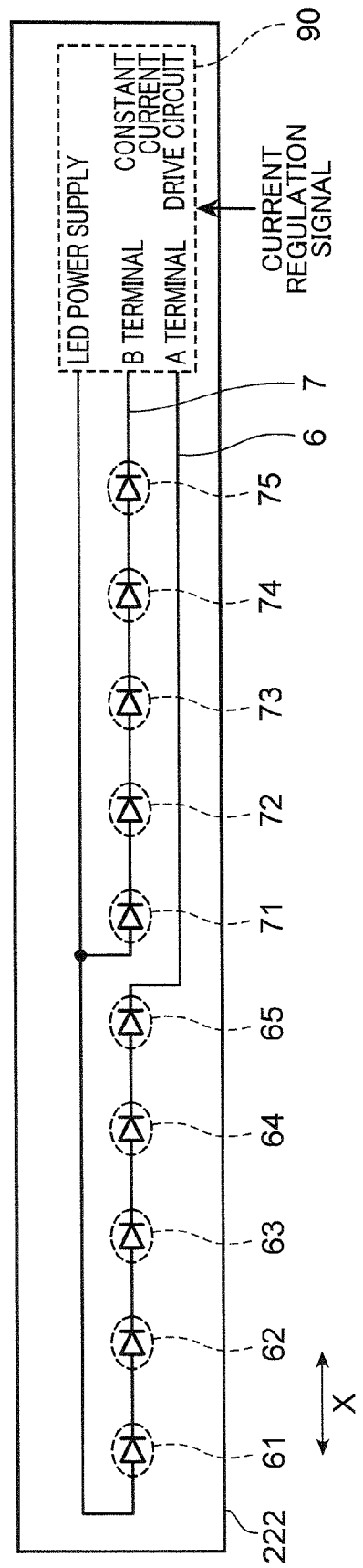
FIG. 3 is a view illustrating an example of a light source unit.

The light source 222 comprises, as shown in FIG. 3, light-emitting circuits 6, 7 each having 5 white LEDs (each white LED has a combination of a blue LED and a phosphor covering it) connected in series to each other. The number of the white LEDs (5 in this example) forming each light-emitting circuit and the number of the light-emitting circuits (2 in this example) are given as mere examples and are not limited thereto.

The light-emitting circuit 6 has white LEDs 61 to 65 which are connected in series to each other. It is connected between an A terminal of a constant current drive circuit 90 and a power supply. The light-emitting circuit 7 has white LEDs 71 to 75 which are connected in series to each other. It is connected between a B terminal of the constant current drive circuit 90 and the power supply. In this way, a plurality of white LEDs 61 to 65 and 71 to 75 are arranged in the main scanning direction (direction along the arrow X) relative to the document.

The constant current drive circuit 90 supplies a constant drive current to the white LEDs 61 to 65 and 71 to 75 to light these LEDs. More specifically, the constant current drive circuit 90 receives a current regulation signal representing current values produced by a drive control unit 11 and a wavelength distribution control unit 12 which are described below. The constant current drive circuit 90 supplies a drive current having the current value represented by the current regulation signal, to the light-emitting circuits 6, 7 to turn on the light-emitting circuits 6, 7. This results in lighting the blue LEDs which form the white LEDs of the light-emitting circuits 6, 7.

A CIS 231 is provided downstream of the scanner unit 22 in the direction in which documents are fed. The CIS 231 is located at a position where the second side can be scanned in a path along which documents are fed. The second side is opposite to the side scanned by the scanner unit 22.

The document glass 221 is a place where the document is loaded. The light source 222 and the first mirror 223 are supported by the first carriage 226. The second mirror 224 and the third mirror 225 are supported by the second carriage 227.

The image reading apparatus 2 has two scanning modes: a flatbed scanning mode in which the document is placed on the document glass 221 for scanning by the scanner unit 22, and an ADF scanning mode in which the document is picked up and fed by the ADF during which the document is scanned.

In the flatbed scanning mode, the light source 222 illuminates the document placed on the document glass 221 line by line in the main scanning direction. The reflected light from one line is then reflected from the first mirror 223, the second mirror 224, and the third mirror 225 in this order and is directed to the imaging lens 228. The light going into the imaging lens 228 provides an image on a photosensitive surface of the CCD 229.

When light is illuminated to an object, it is partly reflected and the remaining fraction is absorbed or transmitted. The color tones of the object are determined by the wavelengths of light that are partly reflected. For example, when an object reflects red wavelengths more than others, this object appears red. An object that reflects red wavelengths appears white when it also reflects other wavelengths as well.

Figure 4:
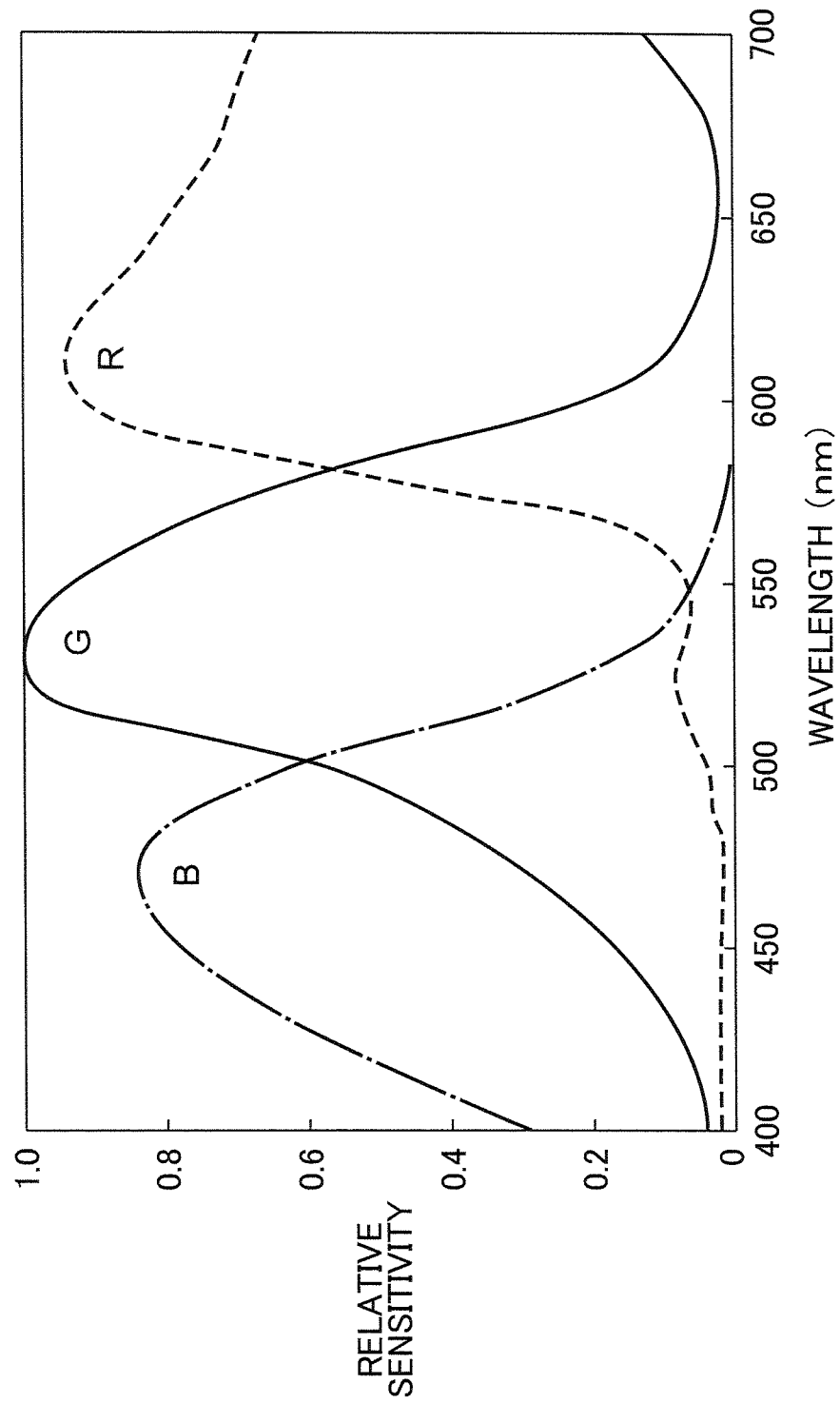
FIG. 4 is a view illustrating an example of a predetermined sensitivity for a light receiving unit.

This principle is used by the CCD 229. When the white light emitted from the white LEDs of the light source 222 is illuminated to the document, some fraction is reflected therefrom as the reflected light. The CCD 229 receives the reflected light and photoelectrically converts it into image data indicating density values of each of RGB with predetermined RGB spectral sensitivity (spectral sensitivity characteristic) according to wavelength of the received light as shown in, for example, FIG. 4. The CCD 229 thus produces the image data corresponding to the scanned document. The CCD 229 in this embodiment is a one-dimensional image sensor that captures the image of the document one line at a time in the main scanning direction.

More specifically, the CCD 229 converts the spectrum of the received light having wavelengths in the region of about 400 nm to about 700 nm, into image data indicating density value of red (R) based on the sensitivity shown as dotted line in the figure. Likewise, the CCD 229 converts the spectrum of the received light having wavelengths in the region about 400 nm to about 700 nm, into image data indicating density value of green (G) based on the sensitivity shown as solid line in the figure. It also converts the spectrum of the received light having wavelengths in the region about 400 nm to about 580 nm, into image data indicating density value of blue (B) based on the sensitivity shown as dash-dotted line in the figure. The higher the sensitivity for each of the RGB colors, the higher density values of RGB when the light corresponding to the wavelengths in that region is received.

The CCD 229 does not always receive the light with the constant intensity for all the wavelengths. Instead, it may receive light with different intensities for different wavelength ranges, as shown in, for example, FIG. 2. In this case, the CCD 229 increases the density values of each of RGB when received the light of the wavelength range, according to increase the intensity of light different from depending on the wavelength range of the received light.

After the CCD 229 captures one line of the document in the main scanning direction, the first carriage 226 and the second carriage 227 are moved in the direction perpendicular to the main scanning direction (i.e., a sub-scanning direction along the arrow Y) to capture the subsequent line.

In the ADF scanning mode, the documents loaded into the document feeder tray 241 are picked up one by one with the paper feed roller 232. The light source 222 illuminates the document when it passes over a scanning position 230 provided in the path from the sheet delivery drum 233 to the paper exit tray 235. The reflected light from one line of the main scanning is reflected from the first mirror 223, the second mirror 224, and the third mirror 225 in this order and is directed to the imaging lens 228. The light going into the imaging lens 228 provides an image on the photosensitive surface of the CCD 229.

The document is then moved by the document delivery unit 21 to scan the subsequent line. The following description is made on the basis that the documents are automatically fed in the ADF scanning mode to scan the images, unless otherwise specified.

In addition, the document delivery unit 21 has a document flipping mechanism which is made up of a change-over guide 236, flip rollers 237, and a duplex document path 238.

After a first face of paper (one side of the document) is scanned in the first ADF scanning, the document flipping mechanism turns the paper and delivers it again to scan a second or back face of the paper (the other side of the document) with the CCD 229. This document flipping mechanism operates only in the two sided scanning and does not operate in the single sided scanning. The change-over guide 236 is shifted to its upper position in the single sided scanning and after the second face of the paper is scanned in the two sided scanning. The paper passed over the sheet delivery drum 233 is ejected into the paper exit tray 235 by the paper exit roller 234. On the other hand, after the first face of paper is scanned in the two sided scanning, the change-over guide 236 is shifted to its lower position. The paper passed over the sheet delivery drum 233 is fed to a nip portion of the flip rollers 237. Then, the change-over guide 236 is shifted to its upper position and the flip rollers 237 are rotated in the reverse direction to again feed the paper to the sheet delivery drum 233 through the duplex document path 238. The mode to scan both sides of the document using the document flipping mechanism is hereinafter referred to as a duplex scanning mode or a high image quality mode.

Furthermore, the image reading apparatus 2 can direct the CCD 229 to scan one side of the document during the delivery of the document as described above while scanning the other side of the document with the CIS 231 in the ADF scanning mode. In other words, the paper fed from the document feeder tray 241 is scanned on one side with the CCD 229 when the paper passes over the scanning position 230 and scanned on the other side when the paper passes over the CIS 231.

The machine body 3 is an example of an image forming unit. It produces color images represented by the image data generated in the image reading apparatus 2 and transfers the color images onto a sheet of paper. More specifically, the machine body 3 comprises a plurality of paper cassettes 461, paper feed rollers 462, a recording unit 40, and a stacking tray 9. The paper feed rollers 462 feeds the paper one page at a time from the paper cassette 461 to the recording unit 40. The recording unit 40 forms an image on the paper fed from one of the paper cassettes 461. The machine body 3 further comprises a manual tray 471. This manual tray 471 can be used for a wide range of recording media including: plain papers that are different in size from those loaded in any paper cassette(s), papers that have been photocopied on one side, and OHP sheets. The recording media is fed one by one into the body 3 with paper feed rollers 472.

The recording unit 40 comprises a neutralization device 421, a charging device 422, an exposure device 423, developing devices 44C, 44M, 44Y, 44K, a transfer drum 49, a transferring device 41, and a fixing device 45. The neutralization device 421 eliminates any residual charge from the surface of a photoconductor drum 43. The charging device 422 causes the surface of the photoconductor drum 43 to become negatively charged after the erasure of the residual charge. The exposure device 423 produces a laser beam to expose the surface of the photoconductor drum 43 according to the image data captured by the scanner unit and forms electrostatic latent images on the surface of the photoconductor drum 43. The developing devices 44C, 44M, 44Y, 44K form toner images of cyan (C), magenta (M), yellow (Y), and black (K), respectively, on the photoconductor drum 43 based on the aforementioned electrostatic latent image. The toner images of the individual colors formed on the photoconductor drum 43 are transferred and overlapped with each other on the transfer drum 49. The transferring device 41 transfers the toner images on the transfer drum 49 to the paper. The fixing device 45 heats the paper on which the toner images have been transferred to fix the toner images to the paper.

It should be noted that cyan, magenta, yellow, and black toners are supplied from respective toner cartridges which are not shown. Delivery rollers 463 and 464 are provided to deliver the paper that has passed through the recording unit 40 into a stacking tray 9 or an output tray 48.

When images are to be formed on both sides of the paper, the recording unit 40 forms images on one side of the paper. This paper is nipped with the delivery rollers 463 on the side of the output tray 48. In this state, the delivery rollers 463 are rotated in the reverse direction to switch back the paper. The paper is again fed to the upstream of the recording unit 40 along a paper delivery path L. The recording unit 40 forms images on the other side of the paper. Thereafter, the paper is ejected to the stacking tray 9 or the output tray 48.

In addition, an operation unit 5 having a display screen and control buttons is provided on a front portion of the machine body 3. The display screen allows a user to visually check control screens and various messages. The control buttons allow the user can enter various commands and instructions.

This operation unit 5 has, for example, a display screen 51 with a touch panel, a numeric keypad 53, and a start button 55. The display screen 51 is made up of a liquid crystal display (LCD) or an electronic luminescent display (ELD) on which printing options are indicated such as paper size, reduction/enlargement percentage, and lighten/darken options.

Figure 5:
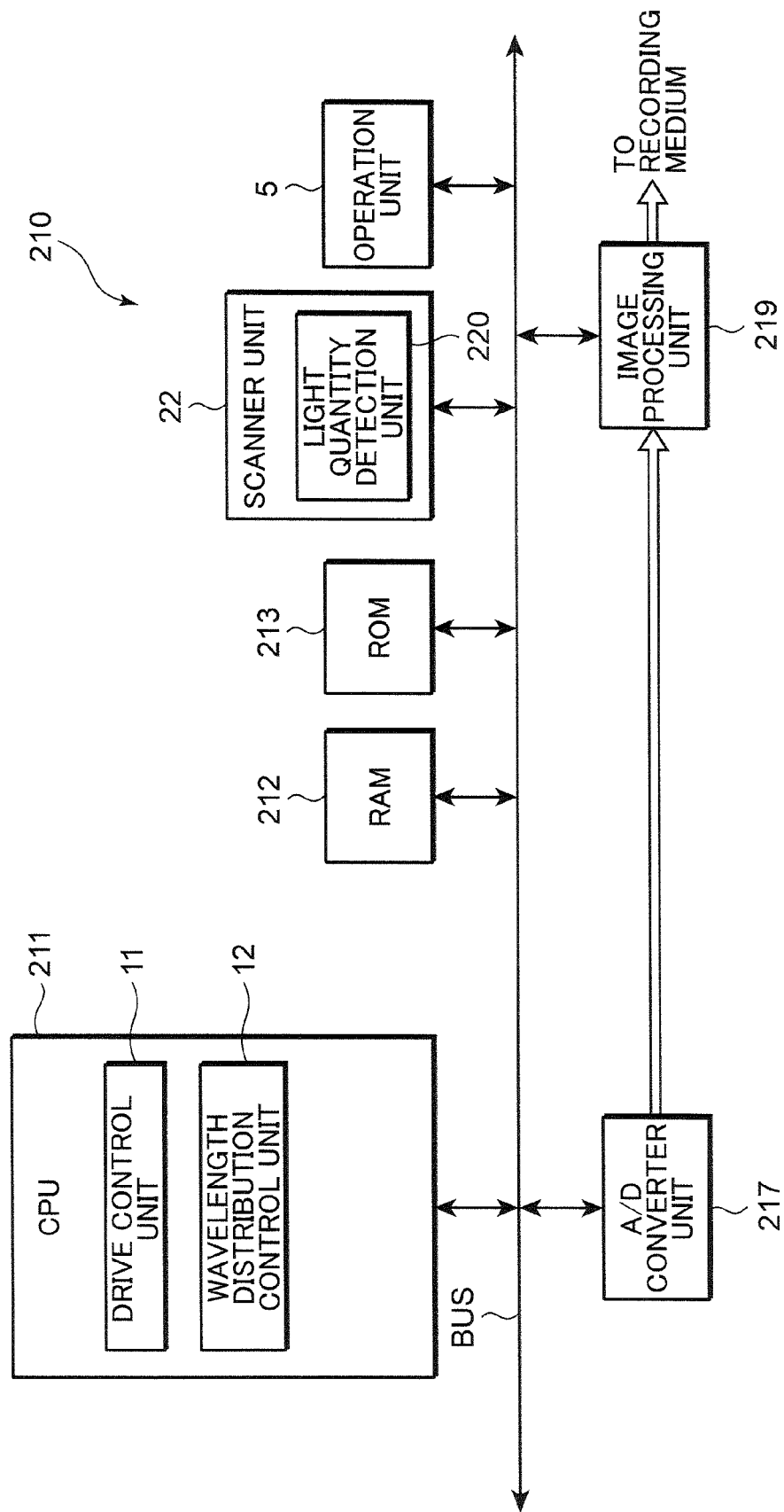
FIG. 5 is a block diagram illustrating an example of an electrical configuration of an image reading apparatus.

Next, an image reading circuit of the image reading apparatus 2 in the multifunction machine 1 is described. FIG. 5 is a block diagram showing an example of an electrical configuration of the image reading apparatus. Description is made in the case of the scanner unit 22, focusing mainly on the components associated with the present invention.

An the image reading circuit 210 of the image reading apparatus 2 comprises a CPU 211, a RAM 212, a ROM 213, the scanner unit 22, the operation unit 5, an A/D converter unit 217, and an image processing unit 219. These components are connected to each other via a bus BUS so that they can be communicated with each other.

The CPU 211 is a control circuit for controlling the entire operation of the multifunction machine 1. The CPU 211 operates according to operation control programs for the multifunction machine 1 and the image reading apparatus 2 stored on the ROM 213 or a HDD which is not shown and serves as a drive control unit 11 and a wavelength distribution control unit 12. Details of the drive control unit 11 and the wavelength distribution control unit 12 are described later.

The RAM 212 is a memory that is used as a working area for the operation control of the multifunction machine 1 and the image reading apparatus 2 by the CPU 211 according to the aforementioned operation control program. The ROM 213 is a memory on which the aforementioned operation control program is stored. The image reading circuit 210 may comprise a storage medium other than the aforementioned memories, such as a nonvolatile memory or a hard disk (HDD).

The operation unit 5 is an interface to receive various instructions from the user, such as an instruction to start copying (instruction to start scanning of the document).

The A/D converter unit 217 converts scanned image data consisting of analog electric signals supplied from the CCD 229 and the CIS 231 of the scanner unit 22 into digital scanned image data to produce the digital scanned image data to the image processing unit 219. The scanner unit 22 comprises a light quantity detection unit 220.

The image processing unit 219 processes image data supplied through the A/D converter unit 217. For example, the image processing unit 219 performs image processing of the image data, such as corrections including level correction and gamma correction, compression or elongation of the image data, or enlarging and reducing thereof. The image data that have been processed are used for the image formation processing in the recording unit 40.

Next, details of the drive control unit 11 and the wavelength distribution control unit 12 are described.

The drive control unit 11 controls the entire operation of the multifunction machine 1. It also controls the operation of the image reading apparatus 2. For example, the drive control unit 11 supplies a plurality of drive current values as described above to the constant current drive circuit 90 to control the drive of a plurality of blue LEDs provided in the light source 222.

The wavelength distribution control unit 12 controls current values for the drive current to be supplied to the constant current drive circuit 90 with a predetermined pattern relative to the line period which corresponds to a scanning period for one line of the document in the main scanning direction.

Figure 6:
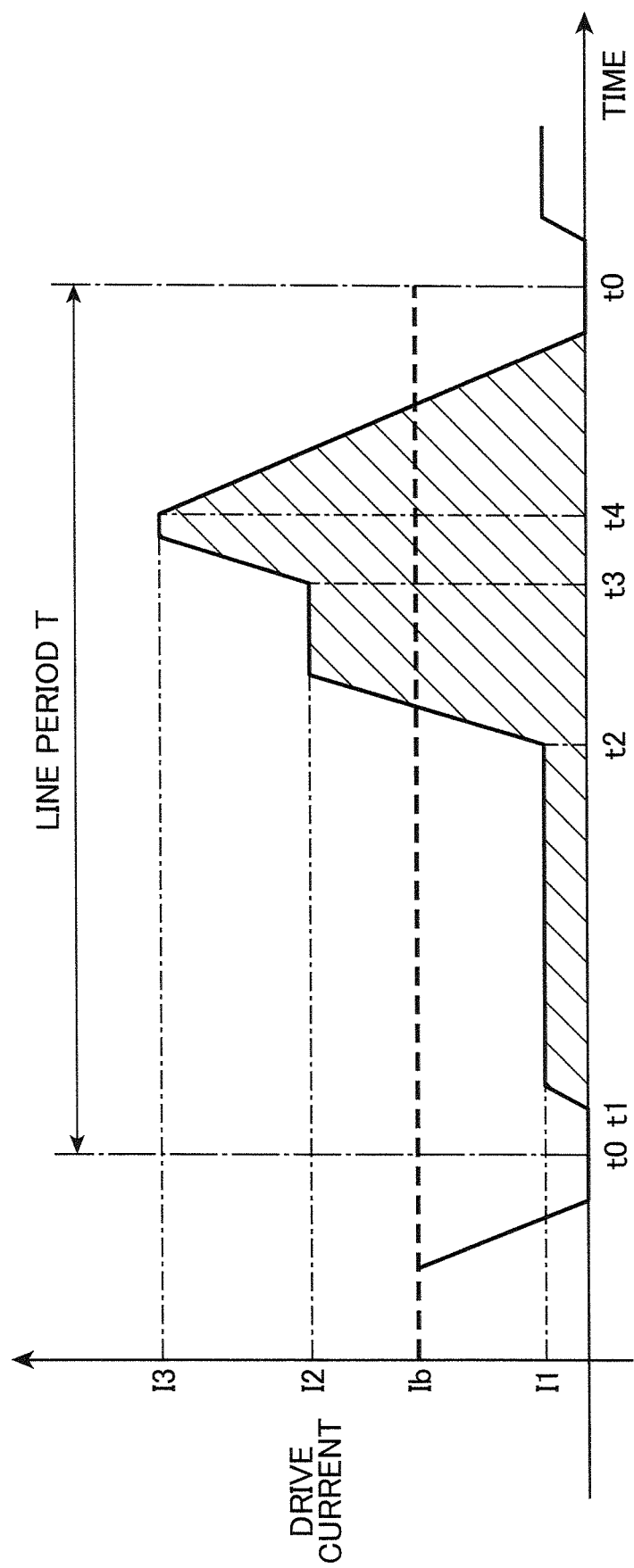
FIG. 6 is a view illustrating an example of a predetermined pattern in a wavelength distribution control unit.

For example, a drive pattern is previously stored on the ROM 213 or a HDD which is not shown. The drive pattern represents, as shown in FIG. 6, the relationship between a current value for the drive current (ordinate) that is supplied by the constant current drive circuit 90 to each of the light-emitting circuits 6, 7 and the time (abscissa) during which the drive current is produced. The line period T corresponds to a scanning period for one line of the document in the main scanning direction. In FIG. 6, the time instant t0 represents the start time for the line period T. More specifically, in FIG. 6, after the lapse of the line period T from the time instant t0, the time instant t0 again occurs and the drive pattern is repeated for every line period T.

When the wavelength distribution control unit 12 reads the drive pattern from the ROM 213 or the HDD which is not shown to control the current value of the drive current according to this drive pattern and supply the current value to the drive control unit 11, the drive control unit 11 supplies a current regulation signal to the constant current drive circuit 90 wherein the current regulation signal represents the current value supplied from the wavelength distribution control unit 12. It should be noted that the current regulation signal representing the current value may directly be supplied from the wavelength distribution control unit 12 to the constant current drive circuit 90.

For example, as shown in FIG. 6, the wavelength distribution control unit 12 supplies a current value I1 of the drive current to the drive control unit 11 at the time instant t1 after the time instant t0 starting the time period T. At the time instant t2, a current value I2 of the drive current is supplied to the drive control unit 11. At the time instant t3, a current value I3 of the drive current is supplied to the drive control unit 11. At the time instant t4, a current value 0 of the drive current is supplied to the drive control unit 11.

When the wavelength distribution control unit 12 supplies each current value to the drive control unit 11, the current regulation signal representing the current value is supplied from the drive control unit 11 to the constant current drive circuit 90. Then, the constant current drive circuit 90 gradually increases or decreases the current value of the drive current represented by the current regulation signal supplied from the drive control unit 11 in order to supply the drive current of the current value to each of the light-emitting circuits 6, 7.

In this way, when the wavelength distribution control unit 12 controls the current value of the drive current and supplies the current regulation signal representing the controlled current value through the drive control unit 11 to the constant current drive circuit 90, the wavelength at which the blue light emitted from the blue LED has the maximum intensity also varies in response to the control of the current value of the drive current.

Figure 7:
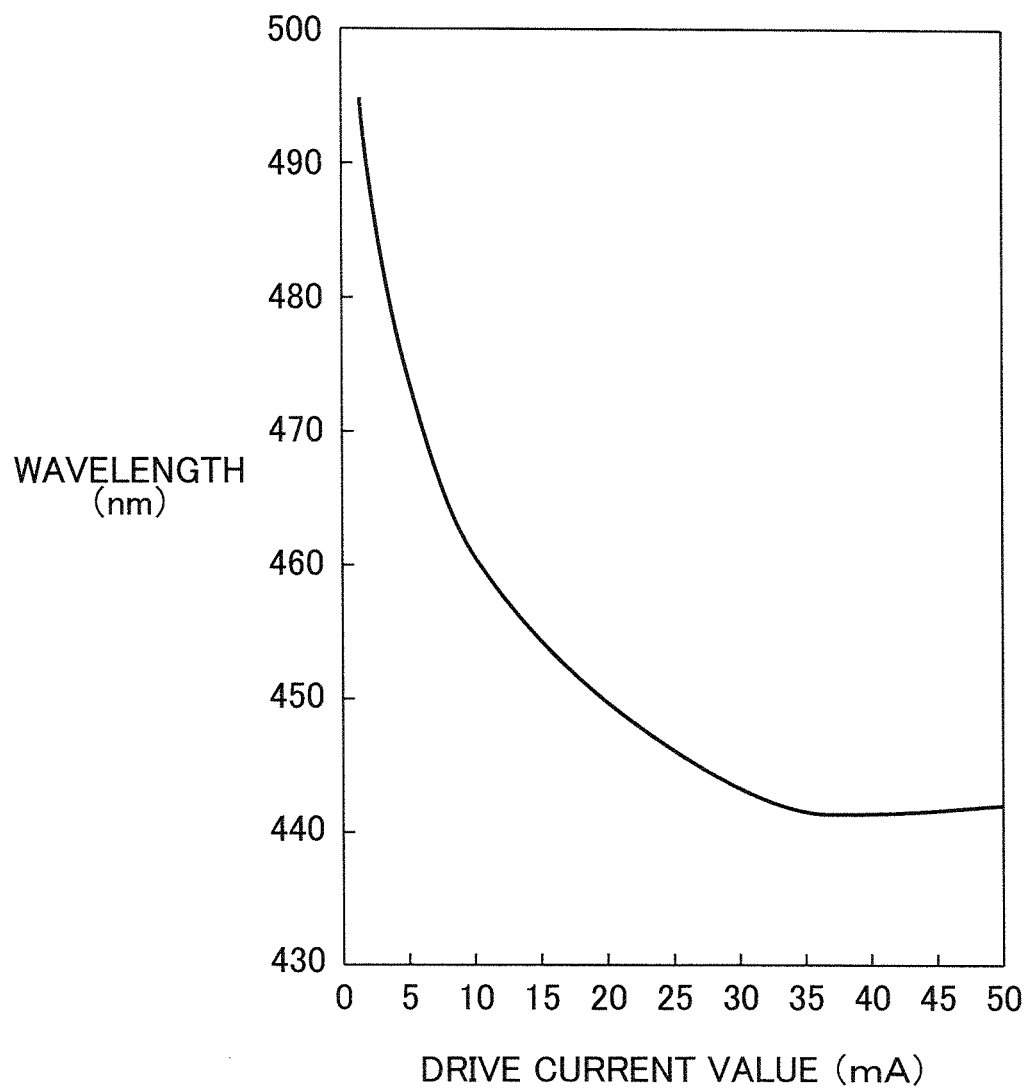
FIG. 7 is a view illustrating an example of a relationship between a current value of a drive current and a wavelength at which blue light produced when the drive current having that current value is supplied to a blue LED has its maximum intensity.

For example, as shown in FIGS. 2 and 7, when the drive control unit 11 supplies a current value of 10 mA of a predetermined drive current stored on the ROM 213 or the HDD which is not shown to the constant current drive circuit 90, the blue light emitted from the blue LED in response to the drive current has the maximum intensity at a wavelength of about 460 nm, as indicated by the left convex of the two convexes represented by the solid line Wn in FIG. 2.

The wavelength distribution after a wavelength of about 520 nm at the right convex of the two convexes represented by the solid line Wn in FIG. 2 exhibits a fluorescent wavelength distribution in which the blue light is obtained through the phosphor covering the blue LED, and has the maximum intensity at a wavelength of about 580 nm.

When the wavelength distribution control unit 12 controls the current value of the drive current to increase the current value of the drive current from 10 mA to 35 mA, the blue light emitted from the blue LED in response to this has the maximum intensity at a wavelength of about 440 nm, as shown in the dash-dotted line Wb in FIG. 2 and shown in FIG. 7.

On the other hand, when the wavelength distribution control unit 12 controls the current value of the drive current to decrease the current value of the drive current from 10 mA to 5 mA, the blue light emitted from the blue LED in response to this has the maximum intensity at a wavelength of about 475 nm as shown in the dotted line Wa in FIG. 2 and shown in FIG. 7.

As apparent from the above, when the wavelength distribution control unit 12 controls the current value of the drive current to increase or decrease it, the wavelength at which the blue light emitted from the blue LED in response to this has the maximum intensity is also decreased (shifted to the left in FIG. 2) or increased (shifted to the right in FIG. 2).

In addition, as shown in FIG. 2, when the wavelength distribution control unit 12 does not control the current value of the drive current to increase or decrease it, the relative intensity of the blue light has a value of 10% or more in a range of the wavelengths from about 440 nm to about 520 nm. When the wavelength at which the blue light has its maximum intensity is varied as described above, then the wavelengths at which the blue light has the relative intensity of 10% or more fall within about 420 nm to about 520 nm.

In other words, when the wavelength distribution control unit 12 controls the current value of the drive current to increase or decrease it, and the wavelength at which the blue light emitted from the blue LED has its maximum intensity is varied, a range of the wavelengths for the blue light is enlarged within which the blue light has a certain level of the intensity.

More specifically, as shown in FIG. 6, the aforementioned drive pattern, which indicates the relationship between the current value of the drive current that is increased or decreased relative to the line period T corresponding to the scanning period for one line of the document in the main scanning direction and the time during which the drive current is produced, represents an example of a pattern that is predetermined for the line period corresponding to the scanning period for one line of the document in the main scanning direction in which the range of the wavelengths of the blue line is enlarged by means of changing the wavelength at which the blue light has its maximum intensity corresponding to the current value of the drive current according to the present invention.

As described above, the wavelength distribution control unit 12 controls the constant current drive circuit 90 during the main scanning for each main scanning to the document to produce two or more durations during which the drive current has constant different values (FIG. 6), and to thereby produces two or more durations during which the blue LED has different peak wavelengths for the individual main scanning operations. In this embodiment, the selection can be made between a first mode and a second mode by using the operation unit 5. The first mode is for causing the wavelength distribution control unit 12 to perform the control of producing two or more durations during which the blue LED has different peak wavelengths in each main scanning to scan the document. The second mode is for causing the wavelength distribution control unit 12 not to perform such control. When the second mode is selected with the operation unit 5, the drive control unit 11 controls the constant current drive circuit 90 so that the drive current has a constant value during the main scanning. Accordingly, in the second mode, the drive current becomes constant (e.g., a drive current Ib) during the line period T shown in FIG. 6.

Figure 8:
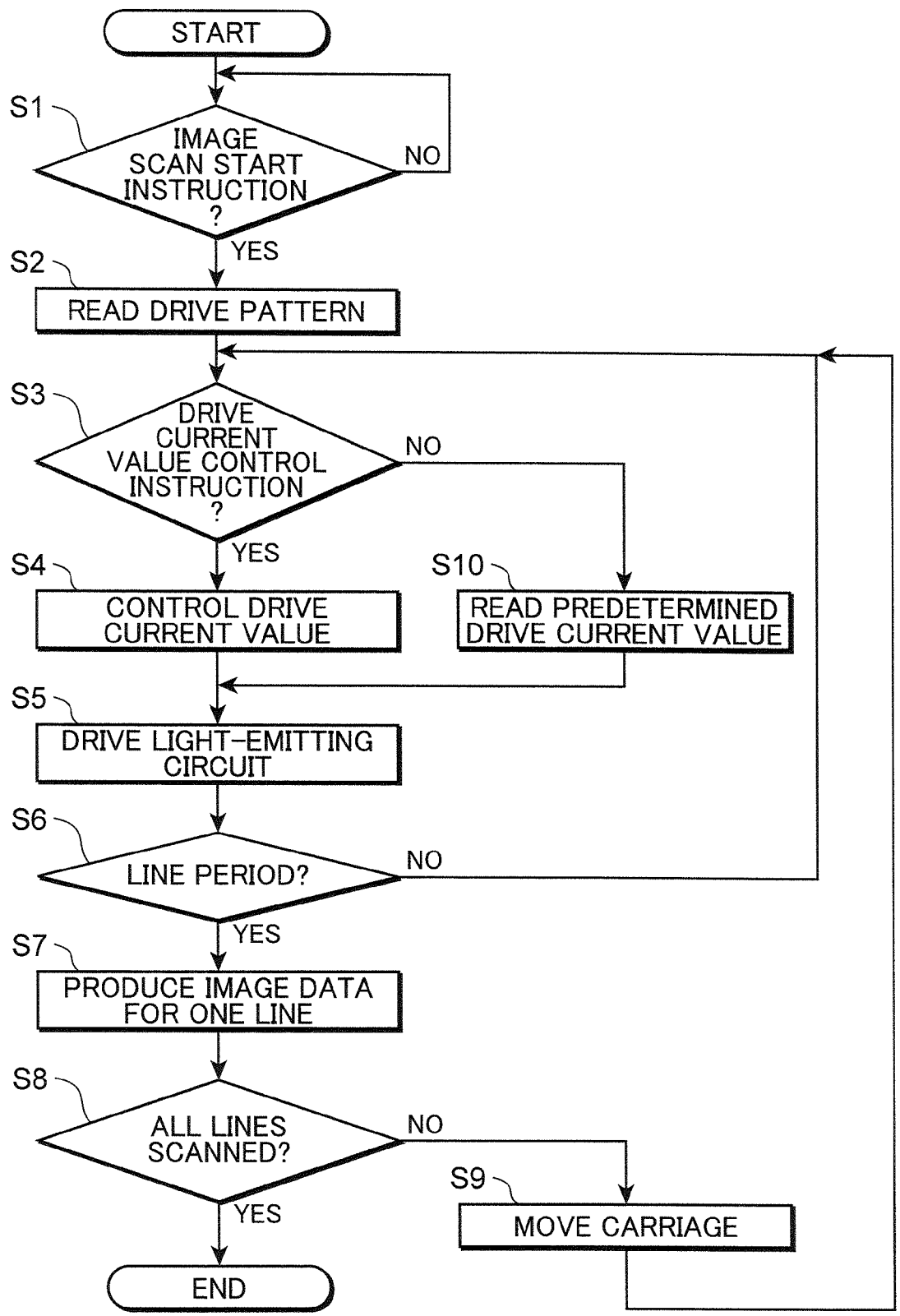
FIG. 8 is a flow chart illustrating an example of image reading.

Next, how the document is scanned is described by using a flow chart shown in FIG. 8.

When an instruction to start scanning of the document(s) is entered with the operation unit 5, the drive control unit 11 starts to scan the document(s) (S1). The wavelength distribution control unit 12 reads the drive pattern previously stored on the ROM 213 or the HDD which is not shown (S2). Then, the drive control unit 11 determines whether an instruction to control the current values of the drive current for the light-emitting circuits 6, 7 is entered with the operation unit 5 (S3). In other words, it determines whether the aforementioned first mode is selected.

When the drive control unit 11 determines that the instruction is entered to control the current values of the drive current for the light-emitting circuits 6, 7 (S3; YES), the wavelength distribution control unit 12 controls the current value of the drive current according to the drive pattern read at the step S2 in order to perform the first mode, and supplies the controlled current value of the drive current to the drive control unit 11 (S4).

When the current value of the drive current is received from the wavelength distribution control unit 12 as a result of the processing at the step S4 or when the current value of the drive current is read in the processing at step S10 as described below, the drive control unit 11 supplies the current regulation signal representing the current value to the constant current drive circuit 90 to direct it to supply the drive current having this current value to the light-emitting circuits 6, 7, and to turn on the blue LEDs forming the white LEDs in the light-emitting circuits 6, 7 (S5). Thus, the white light is illuminated on the document from the light source 222.

On the other hand, when it is determined at the step S3 that no instruction is entered to control, by the drive control unit 11, the current values of the drive current for the light-emitting circuits 6, 7 (S3; NO), the drive control unit 11 reads a current value of a predetermined drive current that is previously stored on the ROM 213 or the HDD which is not shown (S10), to carry out the processing at step S5.

The drive control unit 11 repeats the steps S3 to S5 or a series of processing at the steps S3, S10, and S5 during the line period T (S6; NO).

When the line period T has elapsed (S6; YES), the CCD 229 receives the reflected light from the document illuminated with the white light emitted from the white LEDs of the light source 222 at the steps S4 and S5, and photoelectrically converts the received reflected light into image data indicating density values of each of RGB to produce the image data for scanned one line of the document in the main scanning direction (S7). When the image data for scanned one line of the document in the main scanning direction is produced, the drive control unit 11 determines whether all of the lines of the document have scanned in the main scanning direction (S8).

When the drive control unit 11 determines that not all the lines of the document have scanned in the main scanning direction (S8; NO), it moves the first carriage 226 and the second carriage 227 in the direction perpendicular to the main scanning direction (sub-scanning direction along the arrow Y) (S9) and again carries out the processing at and after the step S3 to scan the subsequent line or lines. On the other hand, when the drive control unit 11 determines that all the lines of the document have already scanned (S8; YES), the scanning operation is completed.

As apparent from the above, according to the present configuration, the wavelength distribution control unit 12 controls the constant current drive circuit 90 during the main scanning for each main scanning to the document to produce two or more durations during which the drive current has constant different values. This results in two or more durations in the main scanning during which the blue LED has different peak wavelengths. For example, as shown in FIG. 6, two or more durations of the constant current each having a different value of the drive current are produced for each main scanning. This produces durations for light-emitting wavelengths represented by Wn, Wa, and Wb, respectively, in FIG. 2 during each main scanning. As a result, the range of the wavelengths for the blue light can be enlarged. In other words, according to the present configuration, the wavelength distribution control unit 12 contributes to change the wavelength at which the blue light emitted from the blue LED has its maximum intensity to enlarge the range of the wavelengths for the blue light, based on the current value of the drive current controlled by the predetermined drive pattern for the line period T (line period: a scanning period for one line of the document in the main scanning direction).

Thus, when the white light as illumination light illuminates one line of the document in the main scanning direction in which the white light is a combination of the fluorescence obtained after the blue light hits the phosphor and the fraction of the blue light that has transmitted through the phosphor, it is possible to illuminate the blue light having a wider wavelength range to one line of the document in the main scanning direction, as compared with the case where the current value of the drive current is not controlled. Consequently, the range of the blue wavelengths of light reflected from the document and received by the CCD 229 becomes increasingly likely to be overlapped with the range of the wavelengths of the natural blue color tones of the document. This means that the reproductivity of the blue color tones can be improved in the image data converted by the CCD 229.

When the light source 222 has two or more white LEDs as shown in FIG. 3, the intrinsic characteristic of the blue LEDs forming the white LEDs causes variations in wavelength distribution of the blue light when the light source 222 directs the illumination light of the white LEDs to the document. This also causes variations in wavelength distribution of the white LEDs as the illumination light. Accordingly, the image data produced when the CCD 229 receives the light reflected from the pixels of the same level on the document may have different color tones.

However, according to the present configuration, the wavelength distribution control unit 12 carries out the control to produce two or more durations each having a different peak wavelength of the blue LED in each main scanning, for each of the plurality of white LEDs. This reduces the aforementioned color tone variations. In other words, according to the present configuration, the wavelength distribution control unit 12 controls the current value of the drive current to enlarge the wavelength range for the blue LEDs. Any variation in wavelength distribution of the white light emitted from the combination of the blue LED and the phosphor causes corresponding variation of the wavelength distribution of the reflected light that is received by the CCD 229. Accordingly, it is possible to reduce the variation in color tone of the image data produced when the CCD 229 receives the light reflected from the pixels of the same level on the document, as compared with the case where the wavelength distribution of the white light emitted from each combination is not varied.

It is preferable that the aforementioned drive pattern is determined in such a manner that a first integration result becomes equal to a second integration result in which: the first integration result is obtained by integrating the current values of the drive current of the subject drive pattern with the duration represented by the line period T, and the second integration result is obtained by integrating the current values of the predetermined drive current (the current values of the drive current when the current values of the drive current supplied to the light-emitting circuits 6, 7 are not controlled by the wavelength distribution control unit 12) read at the aforementioned step S10 with the duration represented by the line period T.

This configuration can be achieved by determining the drive pattern in such a manner that a first area becomes equal to a second area in which, as shown in FIG. 6 for example: the first area is the area of the shaded region in the figure which represents the result of integrating the current values of the drive current in the drive pattern with the duration represented by the line period T, and the second area is the area obtained as a product of the current value Ib of the predetermined drive current read at the aforementioned step S10 with the duration represented by the line period T.

In other words, it is preferable that the wavelength distribution control unit 12 operates a first mode using data which are set the values (e.g., I1, I2, and I3 shown in FIG. 6) of the drive current and the durations (e.g., a duration from t1 to t2, a duration from t2 to t3, and a duration from t3 to t4) of the constant current assigned to the respective values so that the result of integrating the values of the drive current with a single duration (i.e., the line period T) of the main scanning becomes identical between the first mode and the second mode in the waveform pattern of the drive current during the main scanning. The first mode refers to the mode in which the wavelength distribution control unit 12 is directed to perform the control of producing two or more durations each having different peak wavelengths of the blue LEDs during the main scanning, by means of producing two or more durations with the constant different drive current values (e.g., FIG. 6) by controlling the constant current drive circuit 90 during the main scanning for each main scanning of the document. The second mode is the mode in which the wavelength distribution control unit 12 is not directed to perform that control. Accordingly, in the second mode, the drive current has a constant value during a single main scanning period (line period T).

In this case, regardless of whether the wavelength distribution control unit 12 controls the current values of the drive current supplied to the light-emitting circuits 6, 7, it is possible to provide a constant result of integrating the current values of the drive current supplied to the light-emitting circuits 6, 7 with the duration represented by the line period T. Accordingly, regardless of whether the wavelength distribution control unit 12 controls the current values of the drive current supplied to the light-emitting circuits 6, 7, the total quantity of the blue light emitted from the blue LEDs in the light-emitting circuits 6, 7 is kept constant during the duration represented by the line period T. The brightness of the white light illuminated to the document can thus be kept constant as well.

In this embodiment, the wavelength distribution control unit 12 carries out the control to make the waveform patterns of the drive current during the main scanning identical for every main scanning (for example, the wave pattern shown in FIG. 6). Thus, the drive current has the same waveform pattern during the main scanning, i.e., from the first main scanning to the last main scanning to scan a single document. This eliminates variations in white light among the main scanning operations to thereby improve the quality of the scanned images.

This embodiment has thus been described in conjunction with the case where the white LED of the light source 222 (FIG. 1) includes the blue LED and the yellow phosphor, and the white light is generated by using the blue light emitted from the blue LEDs and the yellow light produced when the blue light from the blue LEDs hits the yellow phosphor. However, the present invention is not limited to this specific embodiment. Instead, three different types of LEDs for red, green and blue may be provided, two or more for each. Then, the wavelength distribution control unit 12 may be configured to perform the control of enlarging the wavelength region of the white light as the illumination light of the white LED in the aforementioned embodiment, as well as to control the current values of the drive current supplied to each of the three different types of LEDs. According to this configuration, the wavelength regions for each of the red, green, and blue illumination lights can be enlarged to improve the reproductivity of the RGB color tones of the image data converted by the CCD 229.

That is, green LEDs and red LEDs have narrow range of the light-emitting wavelengths as in the case of the blue LEDs and their peak wavelengths depend on the drive current values. Thus, the present invention can be applied even when the light source 222 includes red LEDs, green LEDs, and blue LEDs, and red light from the red LEDs, green light from the green LEDs, and blue light from the blue LEDs are used to produce the white light. In this case, the wavelength distribution control unit 12 performs the control of producing two or more durations each having a different LED peak wavelength during each main scanning for each of the red, green and blue LEDs.

The aforementioned present embodiment encompasses the invention having the following features.

A document scanning device according to the present invention comprises a light source unit for illuminating an illumination light from a light-emitting device to a document; a light receiving unit for receiving a reflected light reflected from the document when the illumination light is emitted from the light source unit, and for converting the received reflected light into an image data at a sensitivity that is predetermined depending on the wavelengths of the received light; a drive control unit for supplying a drive current to the light-emitting device, the drive current being for use in turn-on the light-emitting device; and a wavelength distribution control unit for controlling a current value of the drive current according to a pattern that is predetermined for a line period that is a scanning period for one line of the document in a main scanning direction to enlarge the range of the wavelengths of the illumination light by means of changing the wavelength at which the illumination light corresponding to the current value of the drive current has its maximum intensity.

While the aforementioned embodiment has been described in conjunction with a case of a multifunction machine having scanning, printing, and copying functions as an example of an image forming apparatus according to the present invention, the image forming apparatus according to the present invention is not limited to a multifunction machine. It may be any other image forming apparatus having an image reading apparatus according to the present invention, such as a copying machine having only the copying function of the multifunction machine.

The present invention is not limited to the configuration described in the aforementioned embodiment and various modifications and changes may be made thereto. The configurations and processing illustrated in the FIGS. 1 to 8 are mere illustrations of an embodiment according to the present invention, and are not intended to limit the present invention to the embodiment.

This application is based on Japanese Patent application No. 2010-219210 filed in Japan Patent Office on Sep. 29, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus comprising:
   a light source unit which includes a light-emitting device having a characteristic that peak wavelength varies depending on a value of a drive current, and illuminates a document with an illumination light using light from the light-emitting device;

a light receiving unit for receiving a reflected light reflected from the document when the illumination light is emitted from the light source unit, and for converting the received reflected light into an image data at a predetermined sensitivity depending on the wavelengths of the received light;

a current drive circuit for supplying the drive current to the light-emitting device to turn on the light-emitting device;

a storage unit for previously storing a wave pattern that represents the relationship between a current value for the drive current and time during which the drive current is produced relative to a line period corresponding to a scanning period for one line of the document in a main scanning direction, and that has two or more durations each having a different value of the drive current in the line period; and a wavelength distribution control unit for producing two or more durations each having a different value of the drive current by controlling the current drive circuit during the main scanning in each main scanning to the document by using the wave pattern read from the storage unit to produce two or more durations each having a different peak wavelength in each main scanning.

2. The image reading apparatus as claimed in claim 1, wherein the light source unit produces the illumination light of white light by using the light from the light-emitting device.

3. The image reading apparatus as claimed in claim 1, wherein the light receiving unit comprises a line sensor unit.

4. The image reading apparatus as claimed in claim 1, wherein the light receiving unit receives the illumination light that is reflected from the document in the illumination light irradiated to the document in order to perform main scanning of the document, and converts intensities of the red, green, and blue components of the received light into electrical signals to be output.

5. The image reading apparatus as claimed in claim 1, wherein the current drive circuit comprises a constant current drive circuit that supplies the drive current of constant current to the light-emitting device to turn on the light-emitting device.

6. The image reading apparatus as claimed in claim 5, wherein the wavelength distribution control unit produces two or more durations of the constant current each having a different value of the drive current by controlling the constant current drive circuit during the main scanning in each main scanning to the document to produce two or more durations each having a different peak wavelength in each main scanning.

7. An image reading apparatus comprising:
a light source unit which includes a light-emitting device having a characteristic that peak wavelength varies depending on a value of a drive current, and illuminates a document with an illumination light using light from the light-emitting device;

a light receiving unit for receiving a reflected light reflected from the document when the illumination light is emitted from the light source unit, and for converting the received reflected light into an image data at a predetermined sensitivity depending on the wavelengths of the received light;

a current drive circuit for supplying the drive current to the light-emitting device to turn on the light-emitting device;

wherein the current drive circuit comprises a constant current drive circuit that supplies the drive current of constant current to the light-emitting device to turn on the light-emitting device;

wherein the wavelength distribution control unit produces two or more durations of the constant current each having a different value of the drive current by controlling the constant current drive circuit during the main scanning in each main scanning to the document to produce two or more durations each having a different peak wavelength in each main scanning, the image reading apparatus further comprising:

an operation unit operated to choose a first mode and a second mode, the first mode being for causing the wavelength distribution control unit to perform the control of producing two or more durations each having a different peak wavelength in each of the main scanning, the second mode being for not causing the wavelength distribution control unit to perform the control; and a drive control unit for controlling the constant current drive circuit so that the drive current indicates a same value during the main scanning, when the second mode is selected with the operation unit, wherein the wavelength distribution control unit operates the first mode using data which are set a plurality of values of the drive current and durations of the constant current assigned to the respective values so that a result of integrating the values of the drive current with a single duration of the main scanning becomes identical between the first mode and the second mode in a waveform pattern of the drive current during the main scanning.

8. The image reading apparatus as claimed in claim 1, wherein the wavelength distribution control unit performs the control so that the waveform patterns of the drive current during the main scanning becomes identical in each the main scanning.

9. The image reading apparatus as claimed in claim 1, wherein
the light source unit includes a plurality of the light-emitting devices, and
the wavelength distribution control unit performs the control of producing two or more durations each having a different peak wavelengths during each the main scanning, for each of the plurality of light-emitting devices.

10. The image reading apparatus as claimed in claim 1, wherein
the light source unit includes a blue LED which is the light-emitting device and an yellow phosphor, and
the illumination light is generated by using blue light emitted from the blue LED and yellow light produced when the blue light from the blue LED is illuminated to the yellow phosphor.

11. The image reading apparatus as claimed in claim 1, wherein
the light source unit includes a red LED, a green LED, and a blue LED as the light-emitting devices, and generates the illumination light using red light from the red LED, green light from the green LED, and blue light from the blue LED, and
the wavelength distribution control unit performs the control of producing two or more durations each having a different peak wavelength in each main scanning for each of the red LED, the green LED, and the blue LED.

12. An image forming apparatus comprising:

the image reading apparatus claimed in claim 1; and an image forming unit that forms a color image represented by image data generated by the image reading apparatus and transfers the color image to a sheet.

13. A method of image reading comprising:

a first step of storing previously, in a storage unit, a wave pattern that represents a relationship between a current value for drive current and time during which the drive current is produced relative to a line period corresponding to a scanning period for one line copy document in a main scanning direction and that has two or more durations, each having a different value of the drive current in the line period;

a second step of producing an illumination light by using light from a light source of which peak wavelength varies depending on a value of the drive current and irradiating the produced illumination light to the document;

a third step of receiving a reflected light reflected from the document when the illumination light is emitted, and converting the received reflected light into an image data at a predetermined sensitivity depending on the wavelength of the received light; and a fourth step of producing two or more durations each having a different value of the drive current during the main scanning by controlling the drive current for turning-on the light source in each main scanning to the document by using the wave pattern read from the storage unit to produce two or more durations each having a different peak wavelength in each main scanning.

14. The method of image reading as claimed in claim 13, wherein the second step includes producing the illumination light of white light by using light from the light source.

15. The method of image reading as claimed in claim 13, wherein the fourth step includes producing two or more durations of constant current each having different values of the drive current.

16. The method of image reading as claimed in claim 13, wherein the third step includes receiving the illumination light that is reflected from the document in the illumination light irradiated to the document in order to perform main scanning of the document, and converting intensities of red, green, and blue components of the received light into electrical signals to be output.

17. The method of image reading as claimed in claim 13, wherein the second step includes producing the illumination light by using light from a plurality of light-emitting devices of the light source, and the fourth step includes producing two or more durations each having a different peak wavelength in each main scanning for each of the plurality of light-emitting devices.

18. The method of image reading as claimed in claim 13, wherein the second step includes producing the illumination light by using blue light emitted from a blue LED which is part of the light source and yellow light produced when the blue light from the blue LED is illuminated to an yellow phosphor.

19. The method of image reading as claimed in claim 13, wherein the second step includes producing the illumination light by using red light from a red LED which is part of the light source, green light from a green LED which is part of the light source, and blue light from a blue LED which is part of the light source, and the fourth step includes producing two or more durations each having a different value of the drive current during the main scanning by controlling the drive current for turn-on each of the red, green, and blue LEDs to produce two or more durations each having a different peak wavelength in each main scanning for each of the red, green, and blue LEDs.

* * * * *